(12) United States Patent
Hotelling et al.

(10) Patent No.: US 9,830,036 B2
(45) Date of Patent: *Nov. 28, 2017

(54) PROXIMITY AND MULTI-TOUCH SENSOR DETECTION AND DEMODULATION

(71) Applicant: Apple Inc., Cupertino, CA (US)

(72) Inventors: Steven P. Hotelling, Los Gatos, CA (US); Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,909

(22) Filed: Jun. 10, 2016

(65) Prior Publication Data

US 2016/0282998 A1    Sep. 29, 2016

Related U.S. Application Data

(63) Continuation of application No. 14/570,915, filed on Dec. 15, 2014, now Pat. No. 9,367,158, which is a
(Continued)

(51) Int. Cl.
*G09G 5/00* (2006.01)
*G06F 3/044* (2006.01)
(Continued)

(52) U.S. Cl.
CPC ............ *G06F 3/044* (2013.01); *G06F 1/3231* (2013.01); *G06F 1/3262* (2013.01); *G06F 3/017* (2013.01);
(Continued)

(58) Field of Classification Search
CPC .. G06F 3/03547; G06F 3/0412; G06F 3/0414; G06F 345/174; G06F 3/044; G06F 3/045
(Continued)

(56) References Cited

U.S. PATENT DOCUMENTS 5,347,295 A    9/1994  Agulnick et al.
5,481,278 A    1/1996  Shigematsu et al.
(Continued)

FOREIGN PATENT DOCUMENTS

EP    1 610 210 A1    12/2005
EP    1 659 481 A2    5/2006
(Continued)

OTHER PUBLICATIONS

Anonymous. (Apr. 13, 2004). Proximity Sensor Demo Kit, User Guide, Version 0.62—Preliminary, Integration Associates, Inc., 14 pages.
(Continued)

*Primary Examiner* — Jennifer Nguyen
(74) *Attorney, Agent, or Firm* — Morrison & Foerster LLP

(57) ABSTRACT

The use of one or more proximity sensors in combination with one or more touch sensors in a multi-touch panel to detect the presence of a finger, body part or other object and control or trigger one or more functions in accordance with an "image" of touch provided by the sensor outputs is disclosed. In some embodiments, one or more infrared (IR) proximity sensors can be driven with a specific stimulation frequency and emit IR light from one or more areas, which can in some embodiments correspond to one or more multi-touch sensor "pixel" locations. The reflected IR signal, if any, can be demodulated using synchronous demodulation. In some embodiments, both physical interfaces (touch and proximity sensors) can be connected to analog channels in the same electrical core.

24 Claims, 10 Drawing Sheets

US 9,830,036 B2

Page 2

Related U.S. Application Data continuation of application No. 11/649,998, filed on Jan. 3, 2007, now Pat. No. 8,970,501.

(51) Int. Cl.
  *G06F 1/32* (2006.01)
  *G06F 3/041* (2006.01)
  *G06F 3/042* (2006.01)
  *G06F 3/0488* (2013.01)
  *G06F 3/01* (2006.01)
  *G06F 3/02* (2006.01)

(52) U.S. Cl.
  CPC ............ *G06F 3/0227* (2013.01); *G06F 3/041* (2013.01); *G06F 3/042* (2013.01); *G06F 3/0416* (2013.01); *G06F 3/0421* (2013.01); *G06F 3/0488* (2013.01); *G06F 2203/04101* (2013.01); *G06F 2203/04104* (2013.01); *G06F 2203/04106* (2013.01); *G06F 2203/04808* (2013.01); *Y02B 60/1217* (2013.01); *Y02B 60/1289* (2013.01)

(58) Field of Classification Search
  USPC ................................ 345/156, 158, 169, 174
  See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,495,077 A | 2/1996 | Miller et al. | |
| 5,528,267 A | 6/1996 | Ise | |
| 5,764,218 A | 6/1998 | Della Bona et al. | |
| 5,821,922 A | 10/1998 | Sellers | |
| 5,825,352 A | 10/1998 | Bisset et al. | |
| 5,835,079 A | 11/1998 | Shieh | |
| 5,844,506 A | 12/1998 | Binstead | |
| 5,864,334 A | 1/1999 | Sellers | |
| 5,880,411 A | 3/1999 | Gillespie et al. | |
| 5,943,052 A | 8/1999 | Allen et al. | |
| 5,956,291 A | 9/1999 | Nehemiah et al. | |
| 6,073,036 A | 6/2000 | Heikkinen et al. | |
| 6,105,419 A | 8/2000 | Michels et al. | |
| 6,188,391 B1 | 2/2001 | Sealy et al. | |
| 6,216,988 B1 | 4/2001 | Hsu et al. | |
| 6,243,080 B1 | 6/2001 | Molne | |
| 6,308,144 B1 | 10/2001 | Bronfield et al. | |
| 6,310,610 B1 | 10/2001 | Beaton et al. | |
| 6,313,853 B1 | 11/2001 | Lamontagne et al. | |
| 6,323,846 B1 | 11/2001 | Westerman et al. | |
| 6,336,614 B1 | 1/2002 | Kwitek | |
| 6,337,678 B1 | 1/2002 | Fish | |
| 6,414,674 B1 | 7/2002 | Kamper et al. | |
| 6,459,424 B1 | 10/2002 | Resman | |
| 6,480,188 B1 | 11/2002 | Horsley | |
| 6,501,462 B1 | 12/2002 | Garner | |
| 6,610,936 B2 | 8/2003 | Gillespie et al. | |
| 6,611,253 B1 | 8/2003 | Cohen | |
| 6,654,001 B1 | 11/2003 | Su | |
| 6,661,920 B1 | 12/2003 | Skinner | |
| 6,680,677 B1 | 1/2004 | Tiphane | |
| 6,690,387 B2 | 2/2004 | Zimmerman et al. | |
| 6,756,971 B1 | 6/2004 | Ramey et al. | |
| 6,819,312 B2 | 11/2004 | Fish | |
| 6,903,730 B2 | 6/2005 | Mathews et al. | |
| 6,920,619 B1 | 7/2005 | Milekic | |
| 6,943,705 B1 | 9/2005 | Bolender et al. | |
| 6,961,912 B2 | 11/2005 | Aoki et al. | |
| 7,015,894 B2 | 3/2006 | Morohoshi | |
| 7,038,659 B2 | 5/2006 | Rajkowski | |
| 7,046,230 B2 | 5/2006 | Zadesky et al. | |
| 7,058,902 B2 | 6/2006 | Iwema et al. | |
| 7,184,064 B2 | 2/2007 | Zimmerman et al. | |
| 7,289,102 B2 | 10/2007 | Hinckley et al. | |
| 7,319,454 B2 | 1/2008 | Thacker et al. | |
| 7,428,142 B1 | 9/2008 | Ligtenberg et al. | |
| 7,623,892 B2 * | 11/2009 | Hawkins ........... H04M 1/72527 | |
| | | | 455/41.2 |
| 7,653,883 B2 | 1/2010 | Hotelling et al. | |
| 7,663,607 B2 | 2/2010 | Hotelling et al. | |
| 7,834,855 B2 | 11/2010 | Hotelling et al. | |
| 7,884,804 B2 | 2/2011 | Kong | |
| 8,098,233 B2 | 1/2012 | Hotelling et al. | |
| 8,381,135 B2 | 2/2013 | Hotelling et al. | |
| 8,479,122 B2 | 7/2013 | Hotelling et al. | |
| 8,970,501 B2 * | 3/2015 | Hotelling ............... G06F 1/3231 | |
| | | | 178/18.01 |
| 9,250,734 B2 * | 2/2016 | Hotelling ............... G06F 1/3231 | |
| 9,367,158 B2 * | 6/2016 | Hotelling ............... G06F 1/3231 | |
| 9,513,673 B2 | 12/2016 | Hotelling | |
| 2001/0015718 A1 | 8/2001 | Hinckley et al. | |
| 2002/0080123 A1 | 6/2002 | Kennedy et al. | |
| 2002/0140633 A1 | 10/2002 | Rafii et al. | |
| 2002/0158838 A1 | 10/2002 | Smith et al. | |
| 2003/0001899 A1 | 1/2003 | Partanen et al. | |
| 2003/0016253 A1 | 1/2003 | Aoki et al. | |
| 2003/0076363 A1 | 4/2003 | Murphy | |
| 2003/0095095 A1 | 5/2003 | Pihlaja | |
| 2003/0160808 A1 | 8/2003 | Foote et al. | |
| 2003/0179201 A1 | 9/2003 | Thacker | |
| 2004/0056845 A1 | 3/2004 | Harkcom et al. | |
| 2004/0104894 A1 | 6/2004 | Tsukada et al. | |
| 2004/0145601 A1 | 7/2004 | Brielmann et al. | |
| 2004/0150668 A1 | 8/2004 | Myers et al. | |
| 2004/0150669 A1 | 8/2004 | Sabiers et al. | |
| 2004/0233624 A1 * | 11/2004 | Aisenberg ............ G06F 1/1616 | |
| | | | 361/679.56 |
| 2004/0245438 A1 | 12/2004 | Payne et al. | |
| 2005/0015731 A1 | 1/2005 | Mak et al. | |
| 2005/0134578 A1 | 6/2005 | Chambers et al. | |
| 2005/0185364 A1 * | 8/2005 | Bell .................... G06F 3/0488 | |
| | | | 361/679.41 |
| 2005/0223308 A1 | 10/2005 | Gunn et al. | |
| 2005/0248534 A1 | 11/2005 | Kehlstadt | |
| 2005/0275567 A1 | 12/2005 | DePue et al. | |
| 2006/0001655 A1 | 1/2006 | Tanabe | |
| 2006/0012580 A1 | 1/2006 | Perski et al. | |
| 2006/0026521 A1 | 2/2006 | Hotelling et al. | |
| 2006/0033701 A1 | 2/2006 | Wilson | |
| 2006/0044259 A1 * | 3/2006 | Hotelling ............. G06F 1/1616 | |
| | | | 345/156 |
| 2006/0097991 A1 | 5/2006 | Hotelling et al. | |
| 2006/0161870 A1 | 7/2006 | Hotelling et al. | |
| 2006/0197753 A1 | 9/2006 | Hotelling | |
| 2006/0232567 A1 | 10/2006 | Westerman et al. | |
| 2006/0279548 A1 | 12/2006 | Geaghan | |
| 2007/0052693 A1 | 3/2007 | Watari | |
| 2007/0119698 A1 | 5/2007 | Day | |
| 2008/0012835 A1 | 1/2008 | Rimon et al. | |
| 2008/0121442 A1 | 5/2008 | Boer et al. | |
| 2008/0196945 A1 | 8/2008 | Konstas | |
| 2008/0211779 A1 | 9/2008 | Pryor | |
| 2008/0231603 A1 | 9/2008 | Parkinson et al. | |
| 2008/0297487 A1 | 12/2008 | Hotelling et al. | |
| 2009/0244092 A1 | 10/2009 | Hotelling | |
| 2010/0141603 A1 | 6/2010 | Hotelling | |
| 2014/0300579 A1 * | 10/2014 | Rekimoto ............... G06F 3/023 | |
| | | | 345/174 |
| 2017/0068346 A1 | 3/2017 | Hotelling | |

FOREIGN PATENT DOCUMENTS

| | | | |
|---|---|---|---|
| JP | 06-289969 A | 10/1994 | |
| JP | 11-194883 A | 7/1999 | |
| JP | 2000-163031 A | 6/2000 | |
| JP | 2002-342033 A | 6/2000 | |
| WO | WO-92/11623 A1 | 7/1992 | |
| WO | WO-98/43202 A1 | 10/1998 | |
| WO | WO-2004/025449 A2 | 3/2004 | |
| WO | WO-2004/025449 A3 | 3/2004 | |
| WO | WO-2006/026183 A2 | 3/2006 | |

(56) References Cited

FOREIGN PATENT DOCUMENTS

| WO | WO-2006/026183 A3 | 3/2006 |
|---|---|---|
| WO | WO-2006-133018 A2 | 12/2006 |
| WO | WO-2006-133018 A3 | 12/2006 |
| WO | WO-2008/085418 | 7/2008 |

OTHER PUBLICATIONS

European Search Report dated Sep. 1, 2014, for EP Application No. 14157275.0, nine pages.
Final Office Action dated Jun. 7, 2011, for U.S. Appl. No. 11/649,998, filed Jan. 3, 2007, eight pages.
Final Office Action dated Sep. 13, 2012, for U.S. Appl. No. 12/172,998, filed Jul. 14, 2008, 23 pages.
Final Office Action dated Nov. 22, 2013, for U.S. Appl. No. 12/172,998, filed Jul. 14, 2008, 22 pages.
Final Office Action dated Dec. 23, 2013, for U.S. Appl. No. 11/649,998, filed Jan. 3, 2007, ten pages.
Final Office Action dated Nov. 10, 2014, for U.S. Appl. No. 12/172,998, filed Jul. 14, 2008, 24 pages.
International Search Report dated Jul. 8, 2008, for PCT Application No. PCT/US2007/026182, filed Dec. 21, 2007, three pages.
Kahney, L. (Mar. 8, 2004). "Pocket PCs Masquerade as IPods," available at: http://www.wired.com/gadgets/mac/news/2004/03/62543, last visited on Apr. 28, 2008, two pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Jun. 24, 2010, for U.S. Appl. No. 11/649,998, filed Jan. 3, 2007, six pages.
Non-Final Office Action dated Dec. 13, 2010, for U.S. Appl. No. 11/649,998, filed Jan. 3, 2007, eight pages.
Non-Final Office Action dated Mar. 13, 2012, for U.S. Appl. No. 12/172,998, filed Jul. 14, 2008, 17 pages.
Non-Final Office Action dated Sep. 20, 2012, for U.S. Appl. No. 11/649,998, filed Jan. 3, 2007, seven pages.
Non-Final Office Action dated May 22, 2013, for U.S. Appl. No. 11/649,998, flied Jan. 3, 2007, eight pages.
Non-Final Office Action dated Jul. 15, 2013, for U.S. Appl. No. 12/172,998, filed Jul. 14, 2008, 21 pages.
Non-Final Office Action dated May 1, 2014, for U.S. Appl. No. 12/172,998, filed Jul. 14, 2008, 23 pages.
Non-Final Office Action dated Feb. 5, 2015, for U.S. Appl. No. 12/172,993, filed Jul. 14, 2008, 25 pages.
Non-Final Office Action dated Jun. 8, 2015, for U.S. Appl. No. 14/666,146, filed Mar. 23, 2015, nine pages.
Non-Final Office Action dated Jul. 2, 2015, for U.S. Appl. No. 14/570,915, filed Dec. 15, 2014, ten pages.
Notice of Allowance dated Nov. 5. 2014, for U.S. Appl. No. 11/649,998, filed Jan. 3, 2007, five pages.
Notice of Allowance dated Sep. 25, 2015, for U.S. Appl. No. 14/666,146, filed Mar. 23, 2015, five pages.
Notice of Allowance dated Feb. 19, 2016, for U.S. Appl. No. 14/570,915, filed Dec. 15, 2014, five pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
The Gadgeteer. (Jun. 6, 2003). "Apple iPod (30GB)," available at http://the-gadgeteer.com/review/apple_ipod_30gb_review, last visited Apr. 28, 2008, 19 pages.
Westerman, W (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Apple Computer, Inc., "Block Diagram and Buses" Apple Developer Connection, Aug. 3, 2004 downloaded from the Internet from http://developer.apple.com/documentation/Hardware/Developer_Notes/Macintosh_CPUs-G . . . (4 pages).
Apple Computer, Inc., "Powerbook G4" Technology Overview, Apr. 2004 (29 pages).
European Search Report dated Nov. 2, 2015, for EP Application No. 15164429.1, four pages.
Final Office Action dated Feb. 5, 2008, for U.S. Appl. No. 11/731,118, filed Mar. 30, 2007, nine pages.
Final Office Action dated Feb. 20, 2008, for U.S. Appl. No. 10/927,577, filed Aug. 25, 2004, 11 pages.
Final Office Action dated Mar. 26, 2008, for U.S. Appl. No. 10/927,575, filed Aug. 25, 2004, 25 pages.
Final Office Action dated Mar. 4, 2009 for U.S. Appl. No. 11/731,118, filed Mar. 30, 2007, eight pages.
Final Office Action dated Mar. 5, 2009, for U.S. Appl. No. 10/927,575, filed Aug. 25, 2004, 16 pages.
Final Office Action dated Jan. 25, 2010, for U.S. Appl. No. 11/731,118, filed Mar. 30, 2007, nine pages.
Final Office Action dated Mar. 2, 2010, for U.S. Appl. No. 10/927,575, filed Aug. 25, 2004, 16 pages.
Final Office Action dated Sep. 16, 2010, for U.S. Appl. No. 121479,741, filed Aug. 25, 2004, 11 pages.
Final Office Action dated Jul. 27, 2012, for U.S. Appl. No. 12/479,741, filed Jun. 5, 2009, 14 pages.
Final Office Action dated Oct. 12, 2012, for U.S. Appl. No. 13/351,096, filed Jan. 16, 2012, 17 pages.
Final Office Action dated Feb. 13, 2014, for U.S. Appl. No. 12/479,741, filed Jun. 5, 2009, 15 pages.
Non-Final Office Action dated Aug. 22, 2007, for U.S. Appl. No. 10/927,575, filed Aug. 25, 2004, 21 pages.
Non-Final Office Action dated Aug. 22, 2007, for U.S. Appl. No. 11/731,113, filed Mar. 30, 2007, seven pages.
Non-Final Office Action dated Sep. 10, 2007; for U.S. Appl. No. 10/927,577, filed Aug. 25, 2004, 10 pages.
Non-Final Office Action dated Jul. 24, 2008, for U.S. Appl. No. 11/731,118, filed Mar. 30, 2007, 14 pages.
Non-Final Office Action dated Jul. 31, 2008, for U.S. Appl. No. 10/927,577, filed Aug. 25, 2004, 11 pages.
Non-Final Office Action dated Sep. 17, 2008, for U.S. Appl. No. 10/927,575, filed Aug. 25, 2004, 14 pages.
Non-Final Office Action dated Aug. 3, 2009, for U.S. Appl. No. 11/731,118, filed Mar. 30, 2007, 10 pages.
Non-Final Office Action dated Sep. 1, 2009, for U.S. Appl. No. 10/927,575, filed Aug. 25, 2004, 17 pages.
Non-Final Office Action dated Apr. 1, 2010, for U.S. Appl. No. 12/479,741, filed Aug. 25, 2004, 12 pages.
Non-Final Office Action dated Jan. 4, 2012, for U.S. Appl. No. 12/479,741, filed Aug. 25, 2004, 17 pages.
Non-Final Office Action dated Feb. 6, 2012, for U.S. Appl. No. 12/691,702, filed Jan. 21, 2010, 13 pages.
Non-Final Office Action dated Feb. 29, 2012, for U.S. Appl. No. 13/351,096, filed Jan. 16, 2012, 27 pages.
Non-Final Office Action dated Jul. 22, 2013, for U.S. Appl. No. 13/351,096, filed Jan. 16, 2012, 11 pages.
Notice of Allowance dated Mar. 6, 2009, for U.S. Appl. No. 10/927,577, filed Aug. 25, 2004, seven pages.
Notice of Allowance dated Jul. 12, 2010, for U.S. Appl. No. 10/927,575, filed Aug. 25, 2004, four pages.
Notice of Allowance dated Sep. 14, 2011, for U.S. Appl. No. 11/731,118, filed Mar. 30, 2007, seven pages.
Notice of Allowance dated Oct. 1, 2014, for U.S. Appl. No. 12/479,741, filed Jun. 5, 2009, five pages.
Notice of Allowance mailed Jul. 25, 2016, for U.S. Patent Application No. 13/351,096, filed Jan. 16, 2012, seven pages.
PCT International Search Report dated Apr. 10, 2006, for PCT International Appl. No. PCT/US2005/029467, 5 pages.
TouchPad Advanced Features, Synaptics, "Enriching the Interaction Between Humans and Intelligent Devices," Downloaded Aug. 16, 2004 (2 pages) http://www.synaptics.com/products/touchpad_features.cfm.

(56) References Cited

OTHER PUBLICATIONS

Trackpad, Apple Developer Connection (last updated Apr. 19, 2004, printed Aug. 19, 2004) (3 pages) http://developer.apple.com/documentation/Hardware/Developer_Notes/Macintosh_CPUs- . . . .

* cited by examiner

PROXIMITY AND MULTI-TOUCH SENSOR DETECTION AND DEMODULATION

CROSS REFERENCES TO RELATED APPLICATIONS

This application is a continuation of U.S. patent application Ser. No. 14/570,915, filed Dec. 15, 2014 and published on Apr. 9, 2015 as U.S. Patent Publication No. 2015-0097780, which is a continuation of U.S. patent application Ser. No. 11/649,998, filed Jan. 3, 2007 and issued on Mar. 3, 2015 as U.S. Pat. No. 8,970,501 which are incorporated herein by reference in their entirety for all purposes.

FIELD OF THE INVENTION

This relates to panels used as input devices for computing systems, and more particularly, the detection and processing of multi-touch events (the touching of fingers or other objects upon a touch-sensitive surface at distinct locations at about the same time) and hover events (the no-touch, close proximity hovering of fingers or other objects above a touch-sensitive surface but outside the near-field detection capabilities of touch sensors).

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

One limitation of many conventional touch panel technologies is that they are only capable of reporting a single point or touch event, even when multiple objects come into contact with the sensing surface. That is, they lack the ability to track multiple points of contact at the same time. Thus, even when two points are touched, these conventional devices only identify a single location, which is typically the average between the two contacts (e.g. a conventional touchpad on a notebook computer provides such functionality). This single-point identification is a function of the way these devices provide a value representative of the touch point, which is generally by providing an average resistance or capacitance value.

Future touch panels can detect multiple touches and near touches (within the near-field detection capabilities of their touch sensors) occurring at about the same time, and identify and track their locations. Examples of multi-touch panels are described in Applicant's U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

In addition to detection of touching events, the detection of fingers, palms or other objects hovering near the touch panel is desirable because it can enable the computing system to perform certain functions without necessitating actual contact with the touch panel, such as turning the entire touch panel or portions of the touch panel on or off, turning the entire display screen or portions of the display screen on or off, powering down one or more subsystems in the computing system, enabling only certain features, dimming or brightening the display screen, etc. Additionally, merely by placing a finger, hand or other object near a touch panel, virtual buttons on the display screen can be highlighted without actually triggering the "pushing" of those buttons to alert the user that a virtual button is about to be pushed should the user actually make contact with the touch panel. Furthermore, the combination of touch panel and proximity (hovering) sensor input devices can enable the computing system to perform additional functions not previously available with only a touch panel.

SUMMARY OF THE INVENTION

Embodiments of this invention relate to the use of one or more proximity sensors in combination with one or more touch sensors in a multi-touch panel. The combination of these two different types of sensors can be used to detect the presence of one or more fingers, body parts or other objects hovering above a touch-sensitive surface or touching the touch-sensitive surface. A computing system can control or trigger one or more functions in accordance with an "image" of touch or hover provided by the sensor outputs. In some embodiments, one or more infrared (IR) proximity sensors can be driven with a specific stimulation frequency and emit IR light from one or more areas, which can in some embodiments correspond to one or more touch sensor "pixel" locations. The reflected IR signal, if any, resulting from a hovering or touching object, can be demodulated using synchronous demodulation. In some embodiments, both physical interfaces (the touch and proximity sensors) can be connected to analog channels in the same electrical core to generate a value corresponding to the amount of touch or hover.

The concurrent use of a multi-touch panel along with one or more proximity sensors can provide additional detection and operational capabilities not available with a multi-touch panel by itself. For example, although only the actual touching of a finger, palm or other object upon a touch-sensitive surface or an object hovering in the near-field can generally be detected by a capacitive touch sensor, the hovering of a finger, palm or other object above a surface in the far field can be detected due to a change in the output of a photodiode amplifier in the proximity sensor. The detection of a hovering object can enable a computing system to perform certain functions that are preferentially triggered by hovering as opposed to touch. Furthermore, the use of the same analog channel design to receive both the touch sensor outputs in the multi-touch panel and the proximity sensor outputs and generate a value representative of the amount of touch or proximity of an object can enable both touch and proximity sensors to be connected to a single multi-touch subsystem for processing, eliminating the need for separate processing circuitry and reducing overall system costs.

One or more proximity sensors can be used in conjunction with a multi-touch panel. In some embodiments, an exemplary multi-touch panel can include a proximity sensor located at every touch sensor or pixel. In other embodiments, a proximity sensor can be selectively deployed at certain pixels where the detection of touch or hover may be more critical, or in a spread pattern in broad hover-sensitive areas. In still other embodiments, some rows in the multi-touch panel could be proximity sensor rows, with others being touch sensor rows.

The one or more proximity sensors can be used to implement the function of "pushing" virtual buttons appearing on the touch panel (in some embodiments with an audible confirmation) and trigger functions without actually requiring contact with the touch panel. For example, merely by hovering one's finger over a proximity sensor, a user can turn the entire touch panel on or off, turn portions of the touch panel on or off, power down a particular subsystem such as a touch subsystem, enable only certain features, dim or brighten the display, etc. In one specific example, if a user's cheek is detected near the touch panel by one or more proximity sensors, the touch panel can be powered down, and the display device can be dimmed or powered down so there is no reflection off the user's face. It can also provide the aesthetic function of dimming down the display device when brought close to the user's face, and brightening the display when moved away from the face. One or more proximity sensors can also detect that the device is inside a pocket, with similar results.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

One or more proximity sensors together with a plurality of touch sensors in a multi-touch panel can enable a computing system to sense both multi-touch events (the touching of fingers or other objects upon a touch-sensitive surface at distinct locations at about the same time) and hover events (the no-touch, close proximity hovering of fingers or other objects above a touch-sensitive surface but outside the near-field detection capabilities of touch sensors), as well as perform additional functions not previously available with touch sensors alone.

Although some embodiments of this invention may be described herein in terms of proximity sensors in combination with capacitive touch sensors in a multi-touch panel, it should be understood that embodiments of this invention are not so limited, but are generally applicable to the use of proximity sensors with any type of multi-touch sensor technology that can include resistive touch sensors, surface acoustic wave touch sensors, electromagnetic touch sensors, near field imaging touch sensors, and the like. Furthermore, although the touch sensors in the multi-touch panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, it is noted that some touch sensors, particularly capacitive sensors, can detect some hovering or proximity in the near field. Thus, the term "proximity sensor," as used herein, should be understood to be a proximity sensor that is able to detect hovering objects outside the near-field detection capabilities of touch sensors.

Figure 1:
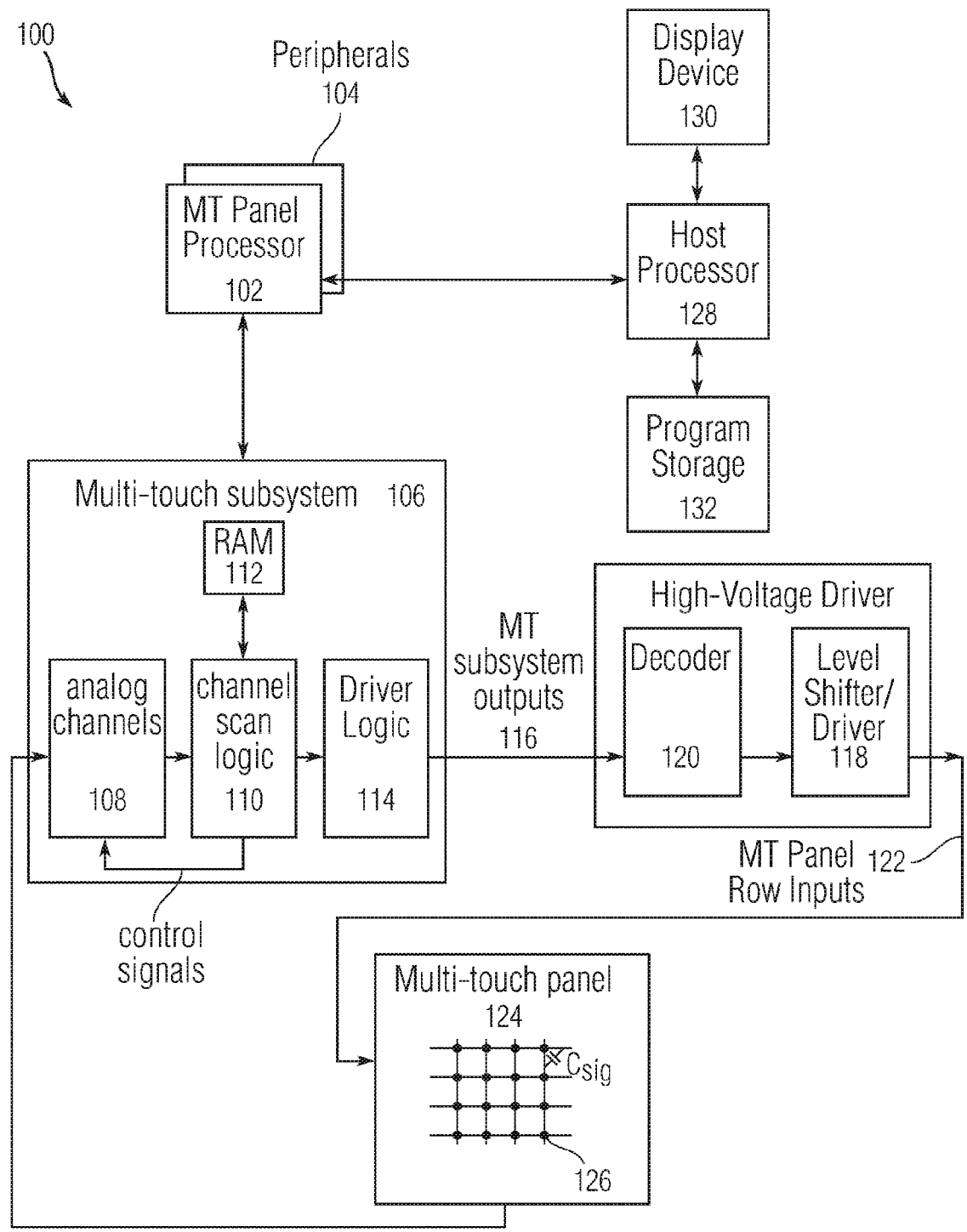
FIG. 1 illustrates an exemplary computing system using a multi-touch panel input device according to one embodiment of this invention.

Multi-touch touch-sensitive panels according to one embodiment of this invention can detect multiple touches (touch events or contact points) that occur at about the same time (and at different times), and identify and track their locations. FIG. 1 illustrates exemplary computing system 100 that uses multi-touch panel 124. Computing system 100 can include one or more multi-touch panel processors 102 and peripherals 104, and multi-touch subsystem 106. One or more processors 102 can include, for example, ARM968 processors or other processors with similar functionality and capabilities. However, in other embodiments, the multi-touch panel processor functionality can be implemented instead by dedicated logic, such as a state machine. Peripherals 104 may include, but are not limited to, random access memory (RAM) or other types of memory or storage, watchdog timers and the like. Multi-touch subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 to analog channels 108. In addition, channel scan logic 110 can control the driver logic and stimulation signals being selectively applied to rows of multi-touch panel 124. In some embodiments, multi-touch subsystem 106, multi-touch panel processor 102 and peripherals 104 can be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each multi-touch panel row input 122 can drive one or more rows in multi-touch panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Multi-touch panel 124 can in some embodiments include a capacitive sensing medium having a plurality of row traces or driving lines and a plurality of column traces or sensing lines, although other sensing media may also be used. The row and column traces may be formed from a transparent conductive medium, such as Indium Tin Oxide (no) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below (cross) each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Computing system 100 can also include host processor 128 for receiving outputs from multi-touch panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 may also perform additional functions that may not be related to multi-touch panel processing, and can be coupled to program storage 132 and display device 130 such as an LCD display for providing a user interface (UI) to a user of the device.

Figure 2A:
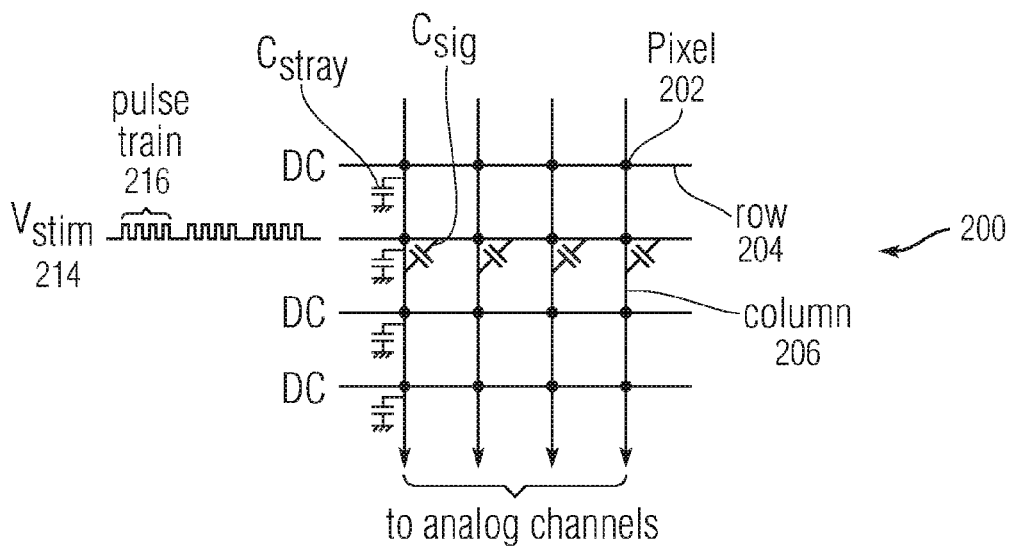
FIG. 2a illustrates an exemplary capacitive multi-touch panel according to one embodiment of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
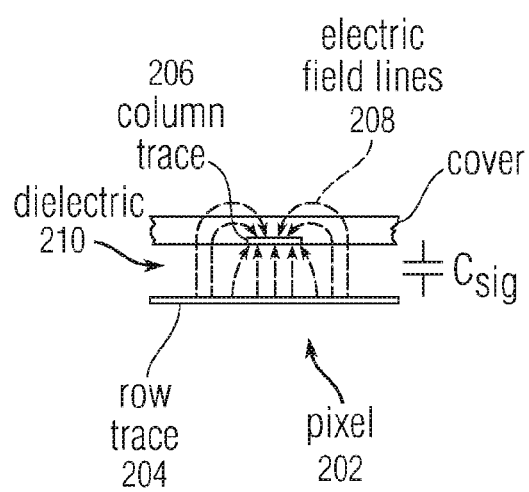
FIG. 2b is a side view of an exemplary capacitive touch sensor or pixel in a steady-state (no-touch) condition according to one embodiment of this invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
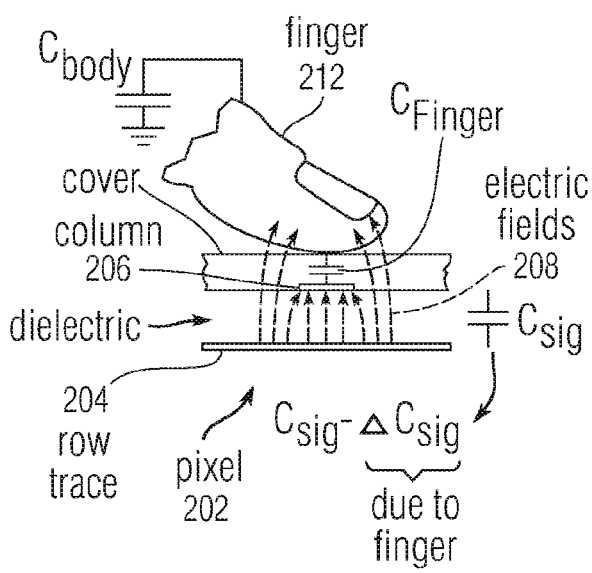
FIG. 2c is a side view of the exemplary capacitive touch sensor or pixel in a dynamic (touch) condition according to one embodiment of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 206 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
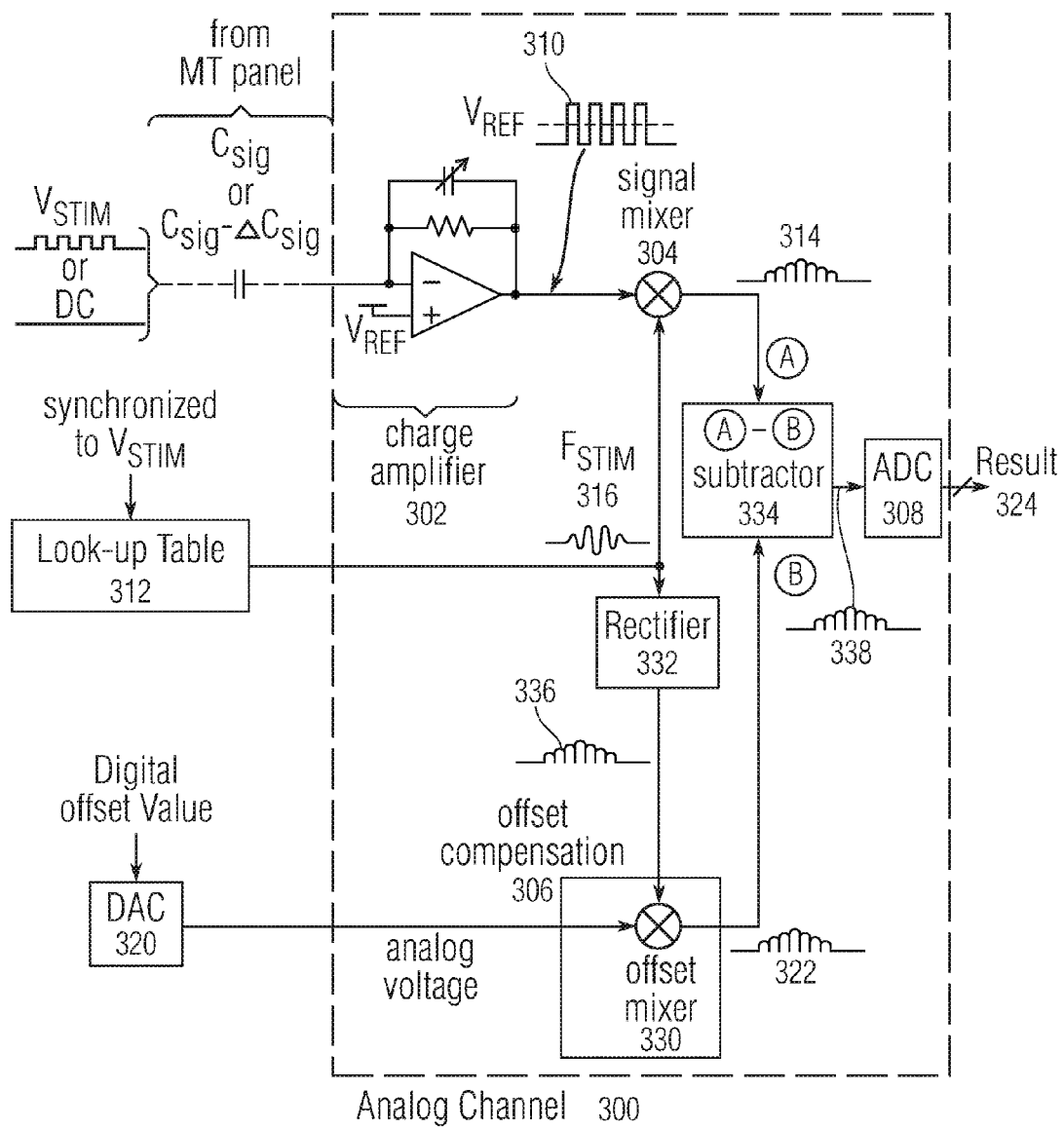
FIG. 3a illustrates an exemplary analog channel (also known as an event detection and demodulation circuit) according to one embodiment of this invention.

FIG. 3a illustrates exemplary analog channel or event detection and demodulation circuit 300. One or more analog channels 300 can be present in the multi-touch subsystem. One or more columns from a multi-touch panel can be connectable to each analog channel 300. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302. For example, if Vstim includes 18V p-p pulses and the gain of the charge amplifier is 0.1, then the output of the charge amplifier can be 1.8V p-p pulses. This output can be mixed in signal mixer 304 with demodulation waveform Fstim 316.

Because Vstim can create undesirable harmonics, especially if formed from square waves, demodulation waveform Fstim 316 can be a Gaussian sine wave in an otherwise DC signal that is digitally generated from look-up table (LUT) 312 or other digital logic and synchronized to Vstim. In some embodiments, Fstim 316 can be tunable in frequency and amplitude by selecting different digital waveforms in LUT 312 or generating the waveforms differently using other digital logic. Signal mixer 304 can demodulate the output of charge amplifier 302 by subtracting Fstim 316 from the output to provide better noise rejection. Signal mixer 304 can reject all frequencies outside the passband, which can in one example be about +/−30 kHz around Fstim. This noise rejection can be beneficial in noisy environment with many sources of noise, such as 802.11, Bluetooth and the like, all having some characteristic frequency that can interfere with the sensitive (femtofarad level) analog channel 300. Signal mixer 304 is essentially a synchronous rectifier as the frequency of the signal at its inputs is the same, and as a result, signal mixer output 314 is essentially a rectified Gaussian sine wave.

Offset compensation 306 can then be applied to signal mixer output 314, which can remove the effect of the static Csig, leaving only the effect of ΔCsig appearing as result 324. Offset compensation 306 can be implemented using offset mixer 330. Offset compensation output 322 can be generated by rectifying Fstim 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the AC capacitance ΔCsig that occurs when a capacitive sensor on the row being stimulated has been touched. Subtractor output 338 is then integrated and can then be converted to a digital value by ADC 308. In some embodiments, integrator and ADC functions are combined and ADC 308 may be an integrating ADC, such as a sigma-delta ADC, which can sum a number of consecutive digital values and average them to generate result 324.

Figure 3B:
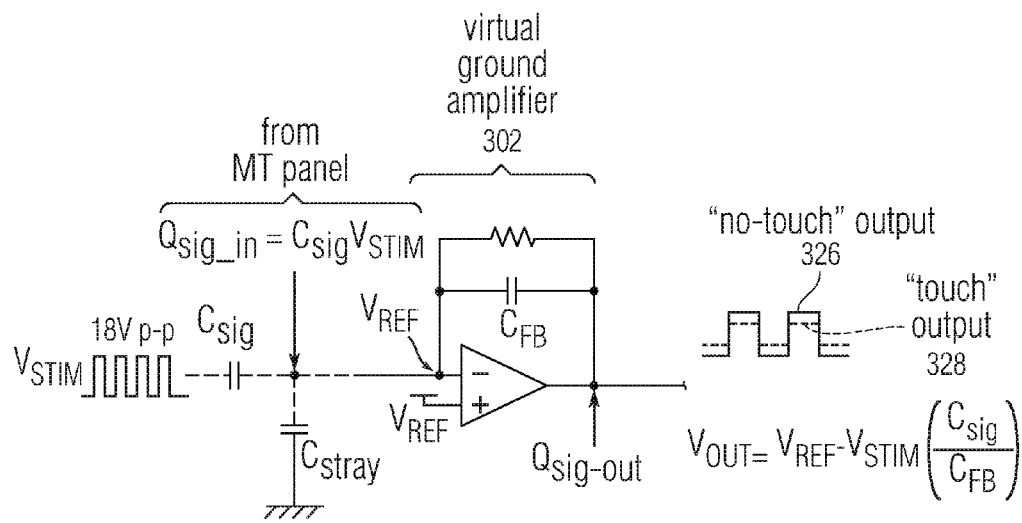
FIG. 3b is a more detailed illustration of a virtual ground charge amplifier at the input of an analog channel, and the capacitance contributed by a capacitive touch sensor and seen by the charge amplifier according to one embodiment of this invention.

FIG. 3b is a more detailed view of charge amplifier (a virtual ground amplifier) 302 at the input of an analog channel, and the capacitance that can be contributed by the multi-touch panel (see dashed lines) and seen by the charge amplifier. As mentioned above, there can be an inherent stray capacitance Cstray at each pixel on the multi-touch panel. In virtual ground amplifier 302, with the +(noninverting) input tied to Vref, the −(inverting) input is also driven to Vref, and a DC operating point is established. Therefore, regardless of how much Csig is present, the − input is always driven to Vref. Because of the characteristics of virtual ground amplifier 302, any charge Qstray that is stored in Cstray is constant, because the voltage across Cstray is kept constant by the charge amplifier. Therefore, no matter how much stray capacitance Cstray is added to the −input, the net charge into Cstray will always be zero. Therefore the input charge Qsig_sense=(Csig−ΔCsig_sense)Vstim is zero when the corresponding row is kept at DC and is purely a function of Csig and Vstim when the corresponding row is stimulated. In either case, because there is no charge across Csig, the stray capacitance is rejected, and it essentially drops out of any equations. Thus, even with a hand over the multi-touch panel, although Cstray can increase, the output will be unaffected by the change in Cstray.

The gain of virtual ground amplifier 302 is usually small (e.g. 0.1) and is equivalent to the ratio of Csig (e.g. 2 pF) and feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

Figure 3C:
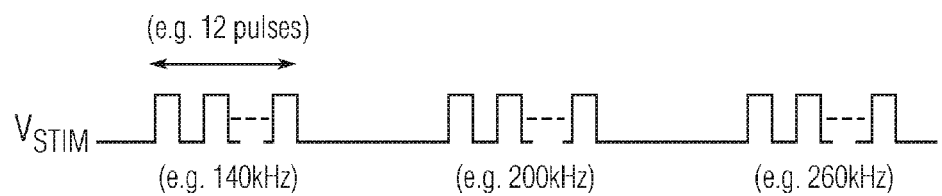
FIG. 3c illustrates an exemplary Vstim signal with multiple pulse trains each having a fixed number of pulses, each pulse train having a different frequency Fstim according to one embodiment of this invention.

FIG. 3c illustrates an exemplary Vstim signal with multiple pulse trains each having a fixed number of pulses, each pulse train having a different frequency Fstim (e.g. 140 kHz, 200 kHz, and 260 kHz). With multiple pulse trains at different frequencies, one or more results can be obtained at each frequency. If a static interferer is present at a particular frequency, the results at that frequency can be corrupted as compared to the results obtained at the other two frequencies, and those results can be eliminated. The results at the remaining two frequencies can be averaged to compute the result.

The multiple Fstims may be applied in different ways to the multi-touch panel. In some embodiments, N columns can be connected to one analog channel via N:1 demultiplexer. A given row would then have to be stimulated N times to acquire Csig for all columns and then repeated for the other two frequencies. This has the advantage that fewer channels are needed but it takes longer to process an image. In other embodiments, one channel can be allotted for each column. A given row only has to be stimulated once to acquire Csig for all columns and then repeated for the other two frequencies. This arrangement has the advantage that it is faster than the previous arrangement described earlier; however, it takes more dedicated channels, which may be necessary for large multi-touch panels and when communications are USB, which could drop packets if too slow. After an entire "image" is captured, it can be processed. In further embodiments, multiple stimuli (scan circuits) can be applied to different rows at the same time to speed up the process. Fstim can be programmable. In some embodiments, a lookup table can be used to synthesize a demodulation waveform. The feedback capacitance Cfb and offset can also be programmable.

Embodiments of this invention relate to the use of one or more proximity sensors in combination with one or more touch sensors in a multi-touch panel to detect the presence of a finger, body part or other object and control or trigger one or more functions in accordance with an "image" of touch provided by the sensor outputs. In some embodiments, one or more infrared (IR) proximity sensors or other types of proximity sensors can be driven with a specific stimulation frequency and emit IR light from one or more areas, which can in some embodiments correspond to one or more touch sensor "pixel" locations. The reflected IR signal, if any, can be demodulated using synchronous demodulation. In some embodiments, both physical interfaces (the touch and proximity sensors) can be connected to analog channels in the same electrical core.

The concurrent use of a multi-touch panel along with one or more proximity sensors can provide additional detection and operational capabilities not available with a multi-touch panel by itself. For example, although only the actual touching of a finger, palm or other object upon a touch-sensitive surface can be detected by a touch sensor, the mere hovering of a finger, palm or other object above a surface can be detected due to a change in the output of a photodiode amplifier in the proximity sensor. The detection of a hovering object can enable a computing system to perform certain functions that are preferentially triggered by hovering as opposed to touch. Furthermore, the use of the same analog channel design to receive both the touch sensor outputs in the multi-touch panel and the proximity sensor outputs and generate a value representative of the amount of touch or proximity of an object can enable both touch and proximity sensors to be connected to a single multi-touch subsystem for processing, eliminating the need for separate processing circuitry and reducing overall system costs.

Figure 4A:
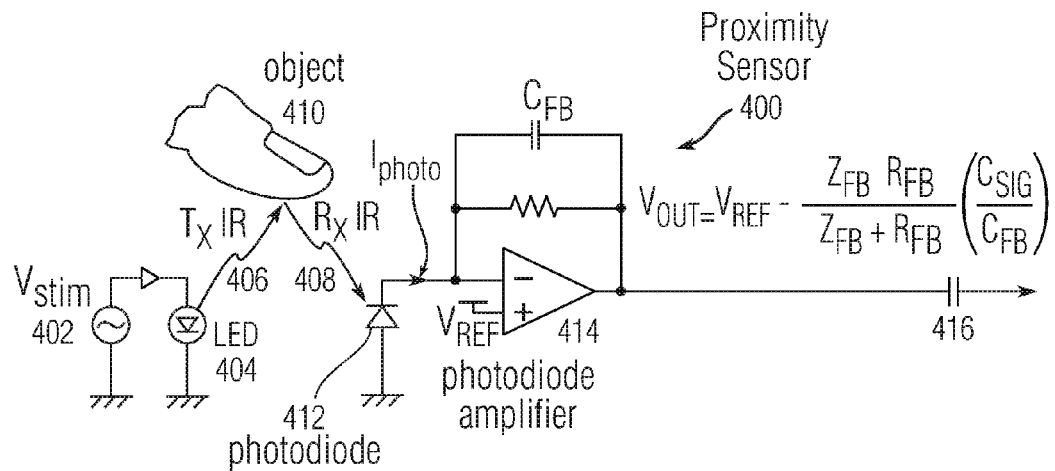
FIG. 4a is an illustration of an exemplary proximity sensor according to one embodiment of this invention.

FIG. 4a is an illustration of exemplary proximity sensor 400 according to some embodiments of this invention. Proximity sensors 400 can detect one or more fingers, a palm or other object touching the multi-touch panel or hovering over the multi-touch panel in the far field without touching it. Proximity sensor 400 can include source Vstim 402 that drives IR light emitting diode (LED) 404, which emits transmitted IR 406. Vstim 402 can include a burst of square waves in an otherwise DC signal, in a manner similar to the Vstim applied to the rows on the capacitive multi-touch panel as described above, although in some embodiments the square waves representing Vstim can be preceded and followed by other non-DC signaling. Reflected IR 408, which may have reflected off of a finger, palm or other object 410, can be detected by photodiode (e.g. a fast pin diode) 412 or any other device (e.g. a phototransistor or other sensing device) whose current changes as a function of received IR light. Photodiode 412 can be reversed biased to a reference voltage Vref, which can be maintained at the −input (inverting input) of photodiode amplifier 414 whose +input (non-inverting input) is tied to Vref. The photocurrent produced through the photodiode, Iphoto, also primarily passes through the parallel combination of feedback resistor Rfb and capacitor Cfb, and the output of the photodiode amplifier is Vref−(Zcfb×Rfb)×(Iphoto+Iin)/(Zcfb+Rfb), the latter term (Zcfb×Rfb)×(Iphoto+Iin)/(Zcfb+Rfb), representing the voltage drop across Rfb and Cfb where Iin is the input current to the inverting input of photodiode amplifier 414 and is usually negligible. The impedance Zcfb is frequency dependent and can be adjusted to optimize the gain of the photo amplifier for a given modulation frequency of the signal Iphoto, whereas Iphoto(t)=Ip×sin(wt) with wt=2× PI×fmod and fmod is the modulation signal, Ip is the amplitude of the modulation signal and Zcfb=−1/(jwt). The modulation frequency fmod is equivalent to the modulation frequency fstm of Vstm. The output of photodiode amplifier 414 can be AC coupled using AC coupling capacitor 416.

Note that if photodetector 412 and LED 404 are close enough to the analog channels, a separate photodiode amplifier 414 may not be required and photodiode 412 can potentially directly connected to an analog channel. A separate photodiode amplifier 414 is usually needed to prevent noise pickup when photodiode 412 is located far away from the analog channels. Because photodiode amplifier 414 provides a low impedance output, noise injection is reduced.

Figure 4B:
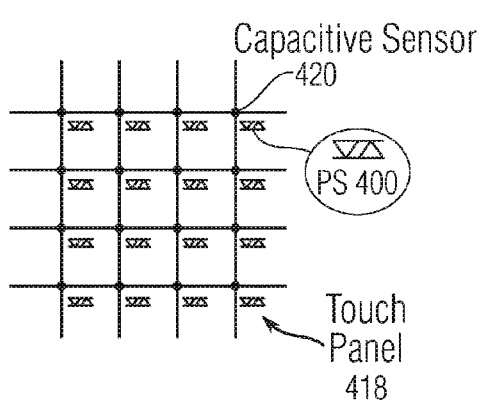
FIG. 4b illustrates an exemplary multi-touch panel with a proximity sensor located at every touch sensor or pixel according to one embodiment of this invention.
Figure 4C:
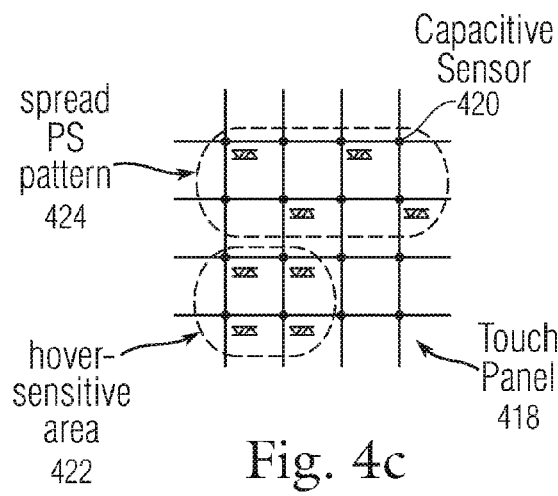
FIG. 4c illustrates an exemplary multi-touch panel with a proximity sensor selectively deployed at certain pixels where the detection of touch or hover is more critical, and in a spread pattern in other areas of the panel according to one embodiment of this invention.
Figure 4D:
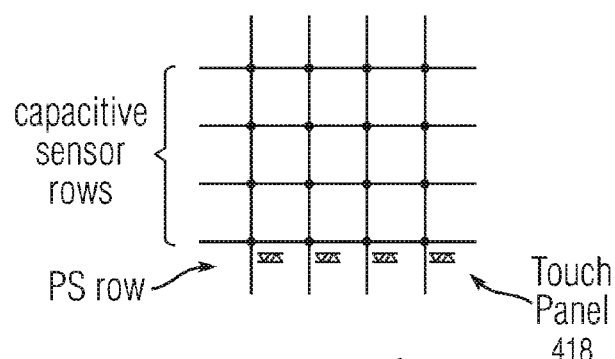
FIG. 4d illustrates and exemplary multi-touch panel with some rows being proximity sensor rows and others being touch sensor rows according to one embodiment of this invention.

One or more proximity sensors can be used in conjunction with a multi-touch panel according to some embodiments of this invention. FIG. 4b illustrates exemplary multi-touch panel 418 with proximity sensor 400 located at every multi-touch sensor or pixel 420 according to some embodiments of this invention. In other embodiments, an example of which is illustrated in FIG. 4c, a proximity sensor can be selectively deployed at certain pixels where the detection of touch or hover can be more critical (see area 422), or in spread pattern 424 in broad hover-sensitive areas. For example, it may be desirable to detect the presence of an ear near the upper half of a multi-touch panel. In still other embodiments, an example of which is illustrated in FIG. 4d, some rows in the multi-touch panel could be proximity sensor rows, with others being multi-touch sensor rows.

One or more proximity sensors 400 can be used to implement the function of "pushing" virtual buttons appearing on the touch panel (in some embodiments with an audible confirmation) and trigger functions without actually making contact with the touch panel. For example, merely by hovering one's finger over a proximity sensor, a user can turn the entire touch panel on or off, turn portions of the touch panel on or off, power down a particular subsystem such as a touch subsystem, enable only certain features, dim or brighten the display, etc. In one specific example, if a cheek is detected near the touch panel by one or more proximity sensors, the touch panel can be powered down, and the display device can be dimmed or powered down so there is no reflection off the user's face. It can also provide the aesthetic function of dimming down the display device when brought close to the user's face, and brightening the display when brought away from the face. One or more proximity sensors can also detect that the device is inside a pocket, with the same result.

Figure 4E:
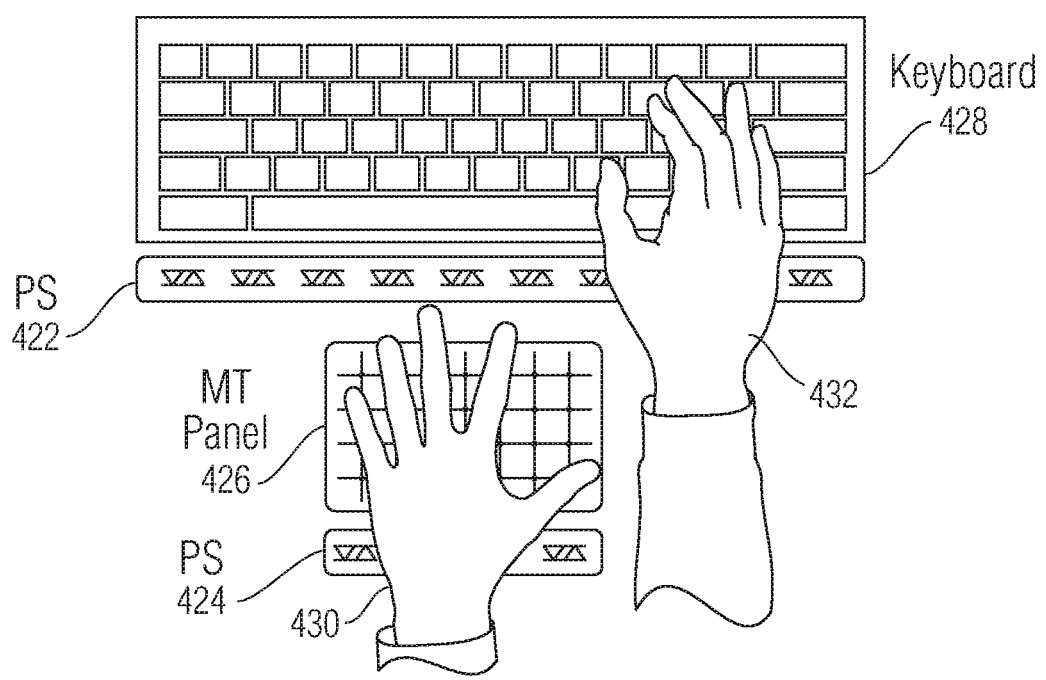
FIG. 4e illustrates an exemplary concurrent use of proximity sensors and a multi-touch panel according to one embodiment of this invention.

FIG. 4e illustrates an exemplary concurrent use of proximity sensors 422 and 424 and multi-touch panel 426 according to some embodiments of this invention. In the example of FIG. 4e, two input devices, a standard keyboard 428 and multi-touch panel 426, can be available to a user. If the user uses multi-touch panel 426 as indicated at 430, the presence of the user's palm can be detected by proximity sensor 424, while proximity sensor 422 does not detect the presence of any finger or palm. In addition, the touch sensors in multi-touch panel 426 can detect the presence of one or more fingers, a palm or other object. In this situation, the computing system can assume that the user is using multi-touch panel 426 but not keyboard 428, and thus input devices related to keyboard 428 can be powered down. However, if the user uses keyboard 428 as indicated at 432, the presence of the user's palm can be detected by proximity sensor 422, while multi-touch panel 426 and proximity sensor 424 may or may not detect the presence of the user's wrist and forearm, for example. In this situation, the computing system can assume that the user is using keyboard 428 but not multi-touch panel 426, and multi-touch panel 426 can be powered down accordingly to save on power and prevent false readings.

Referring again to exemplary proximity sensor 400 of FIG. 4a, note that LED 404 of proximity sensor 400 is driven by a single source Vstim 402, and photodiode 412 drives a single photodiode amplifier 414. This one-to-one-to-one configuration can be used in some embodiments of this invention. However, in other embodiments, the source Vstim may simultaneously drive a plurality of LEDs via a driver stage (such as a FET or bipolar transistor), and/or the photodiodes of a plurality of proximity sensors may be coupled to the same photodiode amplifier. In still other embodiments, the outputs of a plurality of photodiode amplifiers may be AC coupled together.

Figure 5A:
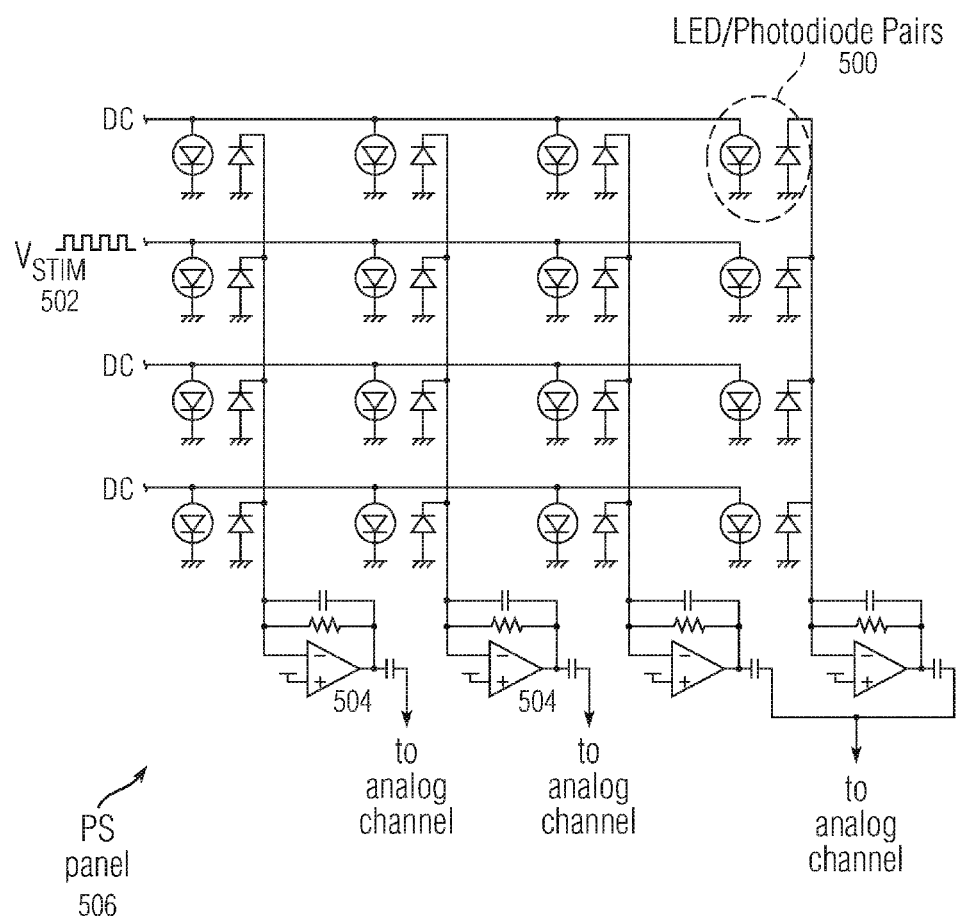
FIG. 5a illustrates an exemplary array of light emitting diode (LED)/photodiode pairs, each pair representing a portion of a proximity sensor, according to one embodiment of this invention.

FIG. 5a illustrates an exemplary proximity sensor panel 506 that can include an array of LED/photodiode pairs 500, each pair representing a portion of a proximity sensor, according to some embodiments of this invention. In FIG. 5a, each LED/photodiode pair 500 in a particular row can be simultaneously stimulated by Vstim 502 with the other rows held at a DC voltage, and after a snapshot of the row has been captured, LED/photodiode pairs 500 in a new row can be stimulated. In the first two columns of FIG. 5a, each LED/photodiode pair 500 in a particular column can be simultaneously connected to a single photodiode amplifier 504, and each photodiode amplifier 504 can be connected to a separate analog channel of the same design as shown in FIG. 3a (i.e. the same analog channel design that can be used to detect changes in signal capacitance in a capacitive touch sensor array). In this manner, for every row being stimulated, the analog channels for each column can determine, at about the same time, whether the LED/photodiode pair in the row being stimulated has detected the presence of a finger, palm or other object. Eventually, if Vstim has been applied to all rows, and the effect of any photodiode current on all columns in all rows has been captured (i.e. the entire proximity sensor panel 506 has been "scanned"), a "snapshot" of all pixel values can be obtained for the entire proximity sensor panel 506. This snapshot data can be initially saved in the multi-touch subsystem, and later transferred out for interpretation by other devices in the computing system such as the host processor. As multiple snapshots are obtained, saved and interpreted by the computing system, it is possible for multiple hover events to be detected, tracked, and used to perform other functions.

In the last two columns of FIG. 5a, each LED/photodiode pair 500 in a particular column can be simultaneously connected to a single photodiode amplifier 504, and each photodiode amplifier 504 can be connected to the same analog channel. (Note that FIG. 5a illustrates two exemplary column configurations for purposes of illustration only, and that it should be understood that the configuration of either the first two columns or the last two columns can typically be used for an entire proximity sensor panel 506.) The configuration of the last two columns results in a composite output in which the analog channel can determine that a LED/photodiode pair in the row being stimulated has detected the presence of a finger, palm or other object, but the exact column at which the detection has occurred is unknown. This embodiment may be suitable when the presence of a finger, palm or other object needs to be detected, but the actual location of the detection need not be pinpointed.

Figure 5B:
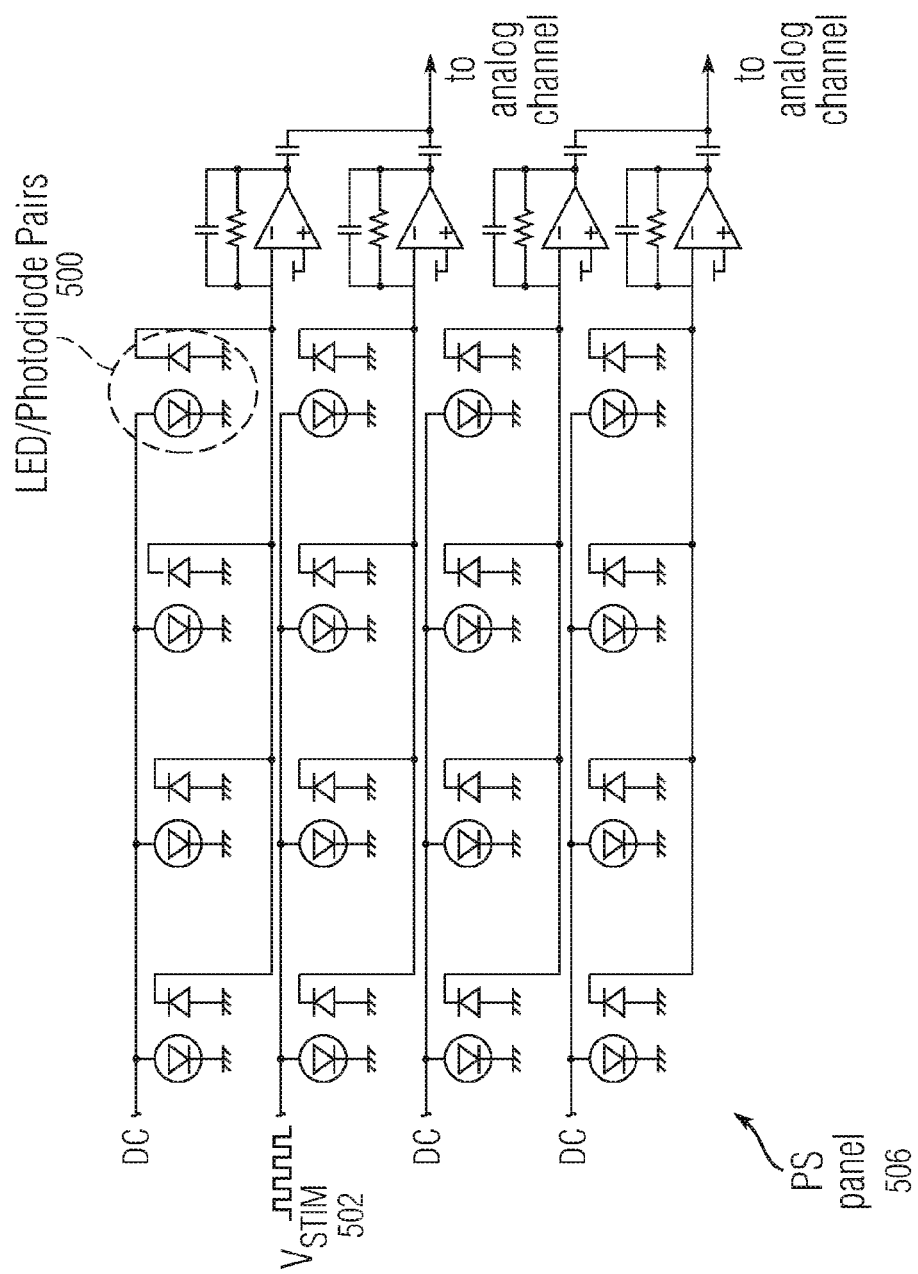
FIG. 5b illustrates an exemplary array of LED/photodiode pairs, each pair representing a portion of a proximity sensor, according to one embodiment of this invention.

FIG. 5b illustrates an exemplary proximity sensor panel 506 that can include an array of LED/photodiode pairs 500, each pair representing a portion of a proximity sensor, according to some embodiments of this invention. The configuration of FIG. 5b, as in the last two columns of FIG. 5a, results in a composite output in which the analog channel can determine that a LED/photodiode pair in the row being stimulated has detected the presence of a finger, palm or other object, but the exact column at which the detection has occurred is unknown. This embodiment may be suitable when the presence of a finger, palm or other object needs to be detected, but the actual location of the detection need not be pinpointed. It should be understood that any combination of proximity sensor configurations shown in FIGS. 4a, 5a and 5b can be employed in accordance with detection needs.

Figure 6A:
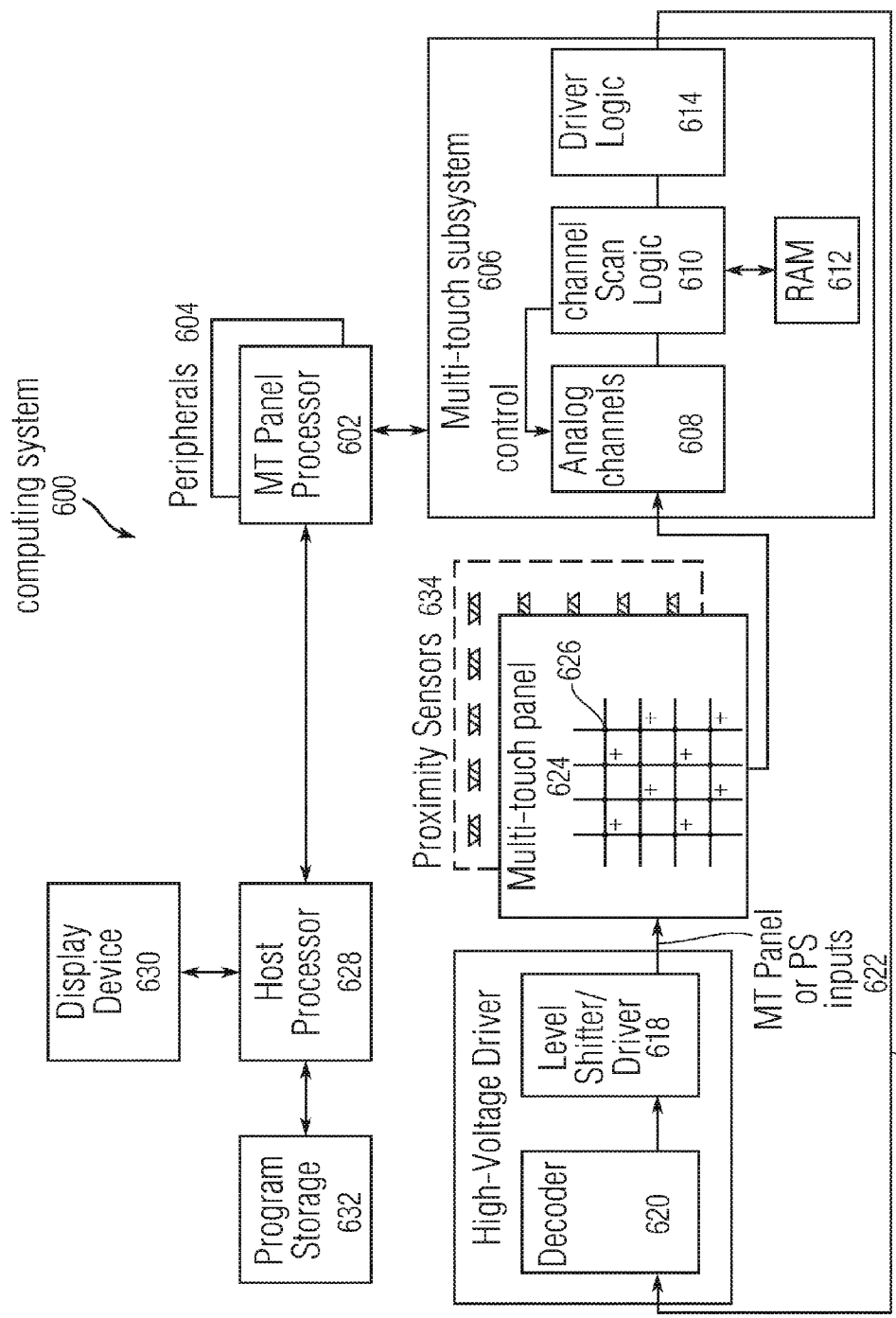
FIG. 6a illustrates an exemplary computing system using both a multi-touch panel and proximity sensors according to one embodiment of this invention.

FIG. 6a illustrates an exemplary computing system 600 using both touch sensors and proximity sensors according to some embodiments of this invention. Computing system 600 may correspond to computing devices such as desktops, laptops, tablets or handhelds, including personal digital assistants (PDAs), digital music and/or video players and mobile telephones. Computing system 600 may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Computing system 600 can include one or more multi-touch panel processors 602 and peripherals 604, and multi-touch subsystem 606. Multi-touch subsystem 606 can include, but is not limited to, analog channels 608, channel scan logic 610 and driver logic 614. Channel scan logic 610 can access RAM 612, autonomously read data from the analog channels and provide control for the analog channels. This control can include multiplexing columns of multi-touch panel 624 or outputs of proximity sensors 634 to analog channels 608. In addition, channel scan logic 610 can control the driver logic and the scanning of multi-touch panel 624 and proximity sensors 634 (i.e. controlling the application of stimulation signals to individuals rows of multi-touch panel 624 and proximity sensors 634).

Driver logic 614 can provide multiple multi-touch subsystem outputs 616 and can present a proprietary interface that drives a high voltage driver, which is comprised of decoder 620 and subsequent level shifter and driver stage 618, although level-shifting functions could be performed before decoder functions. Level shifter and driver 618 can provide level shifting from a low voltage level (e.g. CMOS levels) to a higher voltage level, providing a better signal-to-noise (S/N) ratio for noise reduction purposes. Decoder 620 can decode the drive interface signals to one out of N outputs, whereas N is the maximum number of rows in the panel. Decoder 620 can be used to reduce the number of drive lines needed between the high voltage driver and multi-touch panel 624. Each multi-touch panel row input 622 can drive one or more rows in multi-touch panel 624. In some embodiments, driver 618 and decoder 620 can be integrated into a single ASIC. However, in other embodiments driver 618 and decoder 620 can be integrated into driver logic 614, and in still other embodiments driver 618 and decoder 620 can be eliminated entirely. Proximity sensors 634, although illustrated as a proximity sensor panel having evenly spaced proximity sensors for purposes of illustration only, can also be a proximity sensor panel with unevenly spaced or clustered proximity sensors, one or more rows of proximity sensors, or even a single proximity sensor. Furthermore, although FIG. 6 shows a separate multi-touch panel 624 overlaying a separate proximity sensor panel 634, in some embodiments the multi-touch and proximity sensor panels can be integrated together, or adjacent to each other without any overlap.

The array of touch-sensitive pixels 626 in multi-touch panel 624 can capture an "image" of touch. Additionally, one or more proximity sensors 634, which can be located within multi-touch panel 624 or separate from the panel, can also capture an "image" of touch or hover. In other words, after multi-touch subsystem 106 has determined whether a hover event has been detected at each proximity sensor, the pattern of proximity sensors at which a hover event occurred can be viewed as an "image" of hover (e.g. a finger-shaped pattern)). The columns of multi-touch panel 624 and one or more proximity sensors 634 can drive analog channels 608 in multi-touch subsystem 606.

Computing system 600 can also include host processor 628 for performing additional functions that may not be related to multi-touch panel processing, and can be coupled to program storage 632 which may include, but is not limited to, Read-Only Memory (ROM), Random-Access Memory (RAM), a hard disk drive, removable storage media that can include, for example, CD-ROM, DVD, PC-CARD, flash, floppy disk, magnetic tape, and a network component. Host processor 628 can also be coupled to display device 630 for providing a user interface (UI) to a user of the device. Display device 630 can be configured to display a graphical user interface (GUI) that can include a pointer or cursor as well as other information to the user. By way of example, display device 630 can be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma display and the like.

Computing system 600 in the example of FIG. 6a can advantageously implement a number of functions using both touch sensors and proximity sensors as input devices, providing enhanced capabilities not possible with only touch sensor inputs. For example, the touch sensors can be used to implement the function of "pushing" a virtual button that appears on the multi-touch panel due to an underlying LCD when a finger touches down over the virtual button, while the proximity sensors can be used to implement the function of "pushing" a virtual button when a finger merely hovers over the virtual button without actually making contact with the multi-touch panel. Additionally or alternatively, merely by placing a finger, hand or other object near a proximity sensor, a user can turn the entire multi-touch panel on or off, turn portions of the panel on or off, power down a particular subsystem such as the multi-touch subsystem, enable only certain features, dim or brighten the display, etc. Additionally or alternatively, merely by placing a finger, hand or other object near a proximity sensor, the proximity sensor can cause virtual buttons on the LCD to be highlighted without actually "pushing" those buttons, to alert the user that a virtual button is about to be pushed should the user actually touch the multi-touch panel.

Figure 6B:
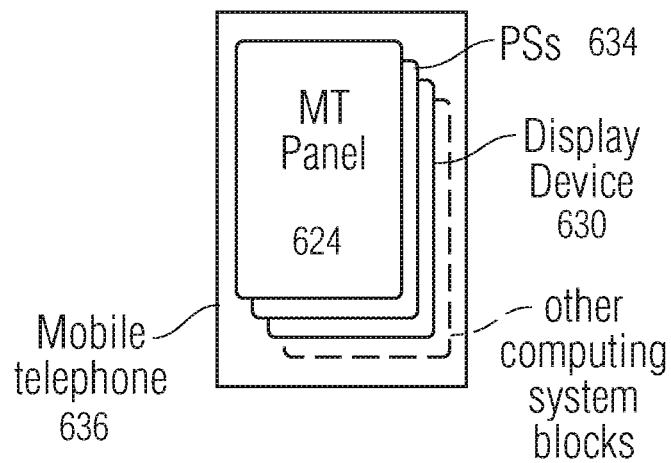
FIG. 6b illustrates an exemplary mobile telephone that can include multi-touch panel, proximity sensors, display device, and other computing system blocks according to one embodiment of this invention.

FIG. 6b illustrates an exemplary mobile telephone 636 that can include multi-touch panel 624, proximity sensors 634, display device 630, and other computing system blocks in computing system 600 of FIG. 6a. In the example of FIG. 6b, if the user's cheek or ear is detected by one or more proximity sensors, computing system 600 can determine that mobile telephone 636 is being held up to the user's head, and therefore some or all of multi-touch subsystem 606, multi-touch panel 624 and proximity sensors 634 can be powered down along with display device 630 to save power. One or more proximity sensors can also detect that the device is inside a pocket, with the same result.

Figure 6C:
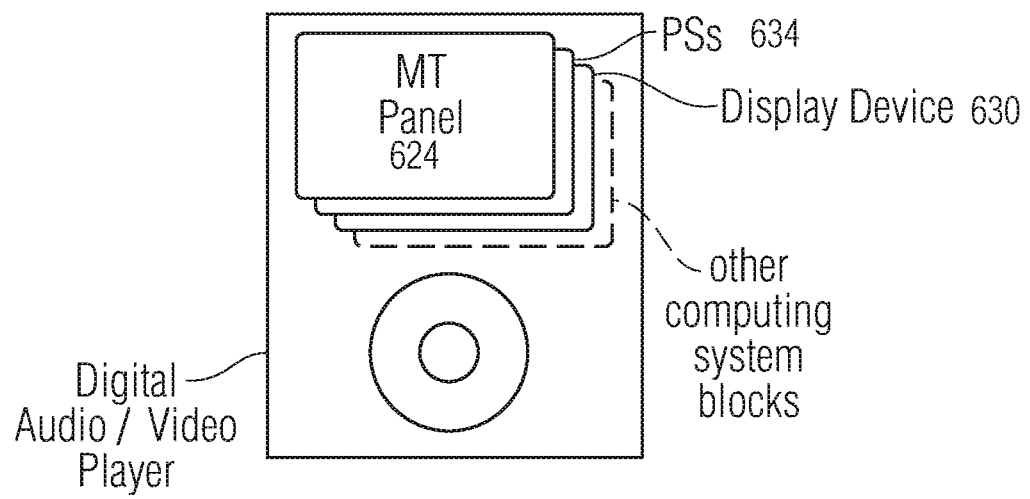
FIG. 6c illustrates an exemplary digital audio/video player that can include multi-touch panel, proximity sensors, display device, and other computing system blocks according to one embodiment of this invention.

FIG. 6c illustrates an exemplary digital audio/video player that can include multi-touch panel 624, proximity sensors 634, display device 630, and other computing system blocks in computing system 600 of FIG. 6a.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A first electronic device, comprising:
 a first sensor array input device configured to detect a presence of a first object and generate one or more signals to enable a first feature; and
 a subsystem communicatively coupled to the first sensor array input device and capable of communication with a second electronic device;
 wherein the first electronic device is configurable for enabling the first feature when a second object is detected by a second sensor array input device on the second electronic device during an absence of the first object at the first sensor array input device.

2. The first electronic device of claim 1, wherein the first sensor array input device comprises one or more touch sensors configured to detect a touching of the first object.

3. The first electronic device of claim 1, wherein the first electronic device is further configurable for enabling the first feature when the second sensor array input device detects that the second object is hovering over the second electronic device.

4. The first electronic device of claim 1, wherein enabling the first feature comprises switching a function from an inactive to an active state.

5. The first electronic device of claim 1, wherein enabling the first feature comprises switching between a first power consumption state and a second power consumption state.

6. The first electronic device of claim 1, further comprising a display communicatively coupled to the subsystem, enabling the first feature comprises switching the display from a first display state to a second display state.

7. The first electronic device of claim 1, wherein the first electronic device is further configurable for enabling the first feature when the second sensor array input device detects that the second object is touching the second electronic device.

8. The first electronic device of claim 1, wherein the first sensor array input device is in a different location as compared to the second sensor array input device.

9. The first electronic device of claim 1, wherein the first sensor array input device comprises one or more proximity sensors configured to detect a hovering of the first object.

10. The first electronic device of claim 1, wherein at least one of the first sensor array input device and the second sensor array input device comprises a touch panel.

11. The first electronic device of claim 1, wherein at least one of the first sensor array input device and the second sensor array input device comprises an array of capacitive touch sensors.

12. The first electronic device of claim 1, wherein at least one of the first sensor array input device and the second sensor array input device comprises an array of proximity sensors.

13. The first electronic device of claim 1, wherein at least one of the first sensor array input device and the second sensor array input device are configured for detecting a location of a touch in two dimensions.

14. A method performed by a first electronic device having a first sensor array input device configured to detect a presence of a first object and generate one or more first signals to enable a first feature, comprising:
 receiving one or more sense signals indicating detection of a second object by a second sensor array input device on a second electronic device; and
 enabling the first feature in the first electronic device when the one or more sensing signals indicating detection of the second object are received during an absence of the first object at the first sensor array input device.

15. The method of claim 14, further comprising detecting a touching of the first object at the first sensor array input device.

16. The method of claim 14, further comprising enabling the first feature in the first electronic device when the second sensor array input device detects that the second object is hovering over the second electronic device.

17. The method of claim 14, wherein enabling the first feature comprises switching a function from an inactive to an active state.

18. The method of claim 14, wherein enabling the first feature comprises switching between a first power consumption state and a second power consumption state.

19. The method of claim 14, further comprising switching a display of the first electronic device from a first display state to a second display state.

20. The method of claim 14, further comprising enabling the first feature when the second sensor array input device detects that the second object is touching the second electronic device.

21. The method of claim 14, further comprising locating the first sensor array input device in a different location as compared to the second sensor array input device.

22. The method of claim 14, further comprising detecting a hovering of the first object over the first sensor array input device.

23. A non-transitory computer-readable storage medium storing program code for performing a method at a first electronic device having a first sensor array input device configured to detect a presence of a first object and generate one or more first signals to enable a first feature, the method comprising:

receiving one or more sense signals indicating detection of a second object by a second sensor array input device on a second electronic device; and enabling the first feature in the first electronic device when the one or more sensing signals indicating detection of the second object are received during an absence of the first object at the first sensor array input device.

24. The non-transitory computer-readable storage medium of claim 23, wherein enabling the first feature comprises switching a function between active and inactive states.

\* \* \* \* \*

UNITED STATES PATENT AND TRADEMARK OFFICE
CERTIFICATE OF CORRECTION

PATENT NO.          : 9,830,036 B2
APPLICATION NO.     : 15/179909
DATED               : November 28, 2017
INVENTOR(S)         : Hotelling et al.

Page 1 of 1

It is certified that error appears in the above-identified patent and that said Letters Patent is hereby corrected as shown below:

In the Claims

At Column 15, Claim 6, Line number 65, please delete "subsystem, enabling" and replace with -- subsystem, wherein enabling --.

Signed and Sealed this
Twenty-sixth Day of June, 2018

Andrei Iancu
*Director of the United States Patent and Trademark Office*